United States Patent [19]
Basso et al.

[11] Patent Number: 5,687,356
[45] Date of Patent: Nov. 11, 1997

[54] HUB AND INTERFACE FOR ISOCHRONOUS TOKEN RING

[75] Inventors: Claude Basso, Nice; Jean Calvignac, La Gaude; Fabrice Verplanken, Cagnes-Sur-Mer, all of France

[73] Assignee: International Business Machines Corporation, Armonk, N.Y.

[21] Appl. No.: 579,555

[22] Filed: Dec. 27, 1995

Related U.S. Application Data

[63] Continuation of Ser. No. 18,618, Feb. 17, 1993, abandoned.

[30] Foreign Application Priority Data

Jun. 22, 1992 [FR] France .................... 92 480084

[51] Int. Cl.$^6$ .................................................. G06F 9/00
[52] U.S. Cl. .................. 395/500; 395/800; 395/200.01; 395/200.02
[58] Field of Search ..................... 395/800, 500, 395/200.01, 200.02

[56] References Cited

U.S. PATENT DOCUMENTS

| | | | |
|---|---|---|---|
| 4,679,191 | 7/1987 | Nelson et al. | 370/84 |
| 4,839,893 | 6/1989 | Smith | 370/100 |
| 4,866,703 | 9/1989 | Black et al. | 370/60 |
| 5,101,198 | 3/1992 | Abou et al. | 340/825.5 |
| 5,195,092 | 3/1993 | Wilson et al. | 370/94.2 |
| 5,200,979 | 4/1993 | Harris | 375/19 |
| 5,206,857 | 4/1993 | Farleigh | 370/85.5 |
| 5,241,543 | 8/1993 | Amada et al. | 370/100.1 |
| 5,257,259 | 10/1993 | Tsurumi | 370/60.1 |
| 5,282,202 | 1/1994 | Bernstein et al. | 370/94.1 |
| 5,301,303 | 4/1994 | Abraham et al. | 395/500 |
| 5,327,428 | 7/1994 | Van As et al. | 370/94.2 |
| 5,343,314 | 8/1994 | Nakamura et al. | 359/123 |
| 5,347,304 | 9/1994 | Moura et al. | 348/12 |
| 5,367,522 | 11/1994 | Otani | 370/84 |
| 5,471,472 | 11/1995 | McClure et al. | 370/85.13 |
| 5,530,842 | 6/1996 | Abraham et al. | 395/500 |
| 5,535,373 | 7/1996 | Olnowich | 395/500 |

FOREIGN PATENT DOCUMENTS

| | | |
|---|---|---|
| 0227852 | 7/1987 | European Pat. Off. . |
| 0289189 | 11/1988 | European Pat. Off. . |
| 0413286 | 2/1991 | European Pat. Off. . |
| 2207327 | 7/1987 | United Kingdom . |
| 8603640 | 6/1986 | WIPO . |

*Primary Examiner*—Jack B. Harvey
*Assistant Examiner*—Valerie Darbe
*Attorney, Agent, or Firm*—Joscelyn G. Cockburn; John B. Frisone

[57] ABSTRACT

A hub featuring ports for attachment of stations to a LAN comprises concentration logic (14) for the handling of multiplexed incoming and outgoing Token-Ring and isochronous signal streams. The concentration logic comprises clock recovery logic (42) from incoming Token-Ring packet data stream (40), for regeneration of Differential Manchester encoded data on output (400), and recovering of Token-Ring clock (401). A cycle framing generator (43) receives a 125 us synchronization clock from the hub backplane (402), and the Token-Ring clock (401), and generates control signals (403) to each of the 10 ports. Each port is comprised of a port transmit interface (44), and a port receive interface (45). Data from a connected station is input (404) to port receive interface (45). Token-Ring packet Differential Manchester encoded data are output (406) to the next active port, specifically to its port transmit interface, along with a recovered strobe clock (405), while ISO data are output (407) to switch (46). The switch and other concentration logic receive a hub local clock (412). Isochronous traffic interchanges with the hub backplane through leads 410 and 411; between ports or between ports and the hub through leads 407 and 409. Data to a connected station is output (408) from port transmit interface (44). Differential Manchester encoded data are received (400) along with Token-Ring clock (401). Control signals are input (403). Isochronous data are received (409). Token-Ring packet Differential Manchester encoded data are finally output from the concentration logic (41).

8 Claims, 7 Drawing Sheets

HUB AND INTERFACE FOR ISOCHRONOUS TOKEN RING

CROSS REFERENCE TO RELATED APPLICATIONS

This application is a continuation of application Ser. No. 08/018,618, filed Feb. 17, 1993, now abandoned.

FIELD OF THE INVENTION

The present invention relates to telecommunications in general, and more particularly to hub and interface for isochronous Token-Ring.

BACKGROUND OF THE INVENTION

The trend in communication industry in the last 15 years has clearly been to try and convey on the same physical media all kinds of different types of data: modems once allowed the transport of computer data on top of voice, thru the already installed telephone network, while some time later, the newly installed Integrated Services Digital Network (ISDN) was originally designed for equally transporting computer data as well as voice, with provision made for video.

End-user equipment has obviously evolved accordingly: current hardware is often ready to handle all three computer data, voice and video, and adaptation of the software is under way according to the technical publications. Workstations or personal computers nowadays already feature adaptation cards for high fidelity sound, video, mass storage with compact discs, etc. . . . The operating systems are on the verge of being able to manage and synchronize all kinds of information data, including those (sound, moving images, etc. . . . ) associated with isochronous signals (i.e. signals characterized by a regular time interval).

The so-called 'Multimedia' revolution is around the corner, with its requirements of larger available bandwidth at the network/end-user interface. New telecommunication media are emerging (ex: 'broadband' ISDN) to fulfill those requirements, but slowly enough and at a significant cost, so that there is a need for an end-user to try and take advantage of the Multimedia capability on the existing networks he is connected to.

In particular thousands of Local Area Networks (LANs) interconnect end-users throughout the world. And amongst them, a great deal feature the Token-Ring architecture (IEEE 802.5 standard).

The Token-Ring architecture is well-known to the man skilled in the art, and a large number of publications deal with the subject, including, but not exclusively, 'LAN protocol' by Mark E. Miller (ISBN 1-55851-0990), 'Inside the Token-Ring' by J. Scott Haugdahl (ISBN 0-939405-00-), 'Handbook of computer communications' by William Stallings (ISBN 0-672-22665-00, 0-02-948071-X and 0-672-22666-9), the teaching of which will be incorporated hereafter.

To give these existing Token-Ring LANs the Multimedia capability and provide them with the necessary extra bandwidth without impacting end-users past investments, implies the following constraints:

- installed wiring should be left unchanged, that is to say no increase of the signal frequency on the physical media is acceptable (as an example, most installed Unshielded Telephone twisted Pairs or UTPs, barely stand a 16 Mbps LAN traffic, and would not stand an increase in the data flow),

- stations having provision for extra bandwidth should be able to connect to standard Token-Ring,

- equipment such as hubs, having provision for extra bandwidth, should be able to handle both standard stations and stations having provision for extra bandwidth, and differentiate between the two,

- the added bandwidth should accommodate today's video compression techniques, as well as future (ex: MPEG2) requiring around 6 Mbps.

A solution that crosses the mind of the man skilled in the art consists in carrying Multimedia traffic on top of the 16 Mbps packet, using the Token-Ring priority feature included in the 802.5 architecture.

The solution however is very poor since:

- the known video compression techniques (DVI, MPEG1) usually require a constant 1.5 Mbps, therefore considerably limiting the number of possible Multimedia stations, or considerably limiting the network traffic for a given number of stations, and also

- supporting of applications having strong requirements as far as jitter control (for example, lip synchronization in videoconferencing) is not demonstrated.

SUMMARY OF THE INVENTION

It is therefore an object of the present invention to provide a method of giving Token-Ring LANs the Multimedia capability by increasing the available bandwidth at the network/end-user interface.

It is a further object of the invention to provide such a method Which is highly compatible with already installed LAN equipment.

It is yet another object of the invention to take advantage of the star wiring topology of Token-Ring networks so as to put resources in a hub and interface to provide a dedicated isochronous channel to each station in addition to a standard 16 Mbps Token-Ring shared data channel.

The invention includes a hub featuring several ports for attachment of stations to a LAN. The hub comprises concentration logic for the handling of multiplexed incoming and outgoing Token-Ring and isochronous flows from and to the stations.

The concentration logic comprises a clock recovery logic from incoming Token-Ring packet data stream, for regeneration of Differential Manchester encoded data, and recovering of Token-Ring clock. It also comprises a cycle framing generator which receives a 125 us synchronization clock (generated locally from a hub internal clock, or directly from the synchronization signals of a Wide Area Network attached to the hub) from the hub backplane, the Token-Ring clock, and generates control signals to each of the ports.

Each port is made up of a port transmit interface, and a port receive interface.

Data from a station hooked to the hub is input to port receive interface. Demultiplexed Token-Ring packet Differential Manchester encoded data are output on to the next active port, and specifically to its port transmit interface, along with a recovered strobe clock, while demultiplexed isochronous data are output to a switch within the hub.

The switch receives the hub local clock, and ensures isochronous traffic interchange with the hub backplane, inbetween ports or between ports and the hub.

Differential Manchester encoded data are received along with Token-Ring clock, the control signals and the isochronous data in the port transmit interface, and are output to the station hooked to the hub.

The invention specifically includes a hub featuring several ports for attachment of stations to a LAN, comprising:

a local clock, a receive interface and a transmit interface at each port, means for generating an isochronous signal resampled by said local clock, means in said receive interface for demultiplexing a hybrid flow composed of intermixed isochronous data and packet data incoming synchronously with the packet data bit time, into respectively an incoming isochronous data flow synchronous with said resampled isochronous signal, and an incoming packet data flow, means in said transmit interface for intermixing an outgoing isochronous data flow synchronous with said resampled isochronous signal, and an outgoing packet data flow in a hybrid flow outgoing synchronously with said packet data bit time, means for circulating said incoming and outgoing packet data flows in a Token-Ring, means for switching said incoming and outgoing isochronous data flows from one station to another station, and means for compensating the asynchronism between said resampled isochronous signal, and said packet data bit time.

The invention also covers an interface for attachment to a 4 b/5 b encoded link composed of an outgoing and an incoming hybrid flow comprising:

a receive logic and a transmit logic, the inputs of said transmit logic being:

a 125 us synchronization, an outgoing isochronous data flow synchronous with said 125 us synchronization, a Token-Ring clock, and an outgoing packet data flow synchronous with said Token-Ring clock, and its output being said hybrid flow outgoing synchronously with said Token-Ring clock, the input of said receive logic being said incoming hybrid flow, and its outputs:

an incoming isochronous data flow synchronous with said 125 us synchronization, and an incoming packet data flow synchronous with said Token-Ring clock, with said outgoing and incoming hybrid flows being organized as a cycle recurrent at a frequency of 8 kHz, comprising an integer of sub-cycles each composed of a 3-symbol field followed by a 5-symbol field, the bit time on said 4 b/5 b encoded link being identical to said Token-Ring clock period, said transmit logic comprising means for, upon 125 us synchronization:

terminating transmitting the current sub-cycle on said outgoing hybrid flow, starting a new cycle by filling said successive 3-symbol fields with a pattern uniquely identifiable in 4 b/5 b and Differential Manchester encoding, the encoded delay between the 125 us synchronization and the actual starting of the new cycle, and data from said outgoing isochronous data flow, and filling said successive 5-symbol fields with data from said outgoing packet data flow, said receive logic comprising:

means for identifying in said incoming hybrid flow said uniquely identifiable pattern, means for, upon identification, concatenating data extracted from said successive 3-symbol fields into said incoming isochronous data flow, and data extracted from said successive 5-symbol fields into said incoming packet data flow.

The interface of the invention is either for the hub side or an attached station side. But the interface for the station needs not be as elaborate in that its transmit logic does fill the successive 3-symbol fields only with data from its outgoing isochronous data flow, and leaves unchanged dual SYMBOLs JK and SP.

BRIEF DESCRIPTION OF THE DRAWINGS

The invention will be better understood from the following detailed description read in conjunction with the following schematics.

The same reference designates the same logic or the same signal throughout all schematics.

DESCRIPTION OF THE PREFERRED EMBODIMENTS

Figure 1:
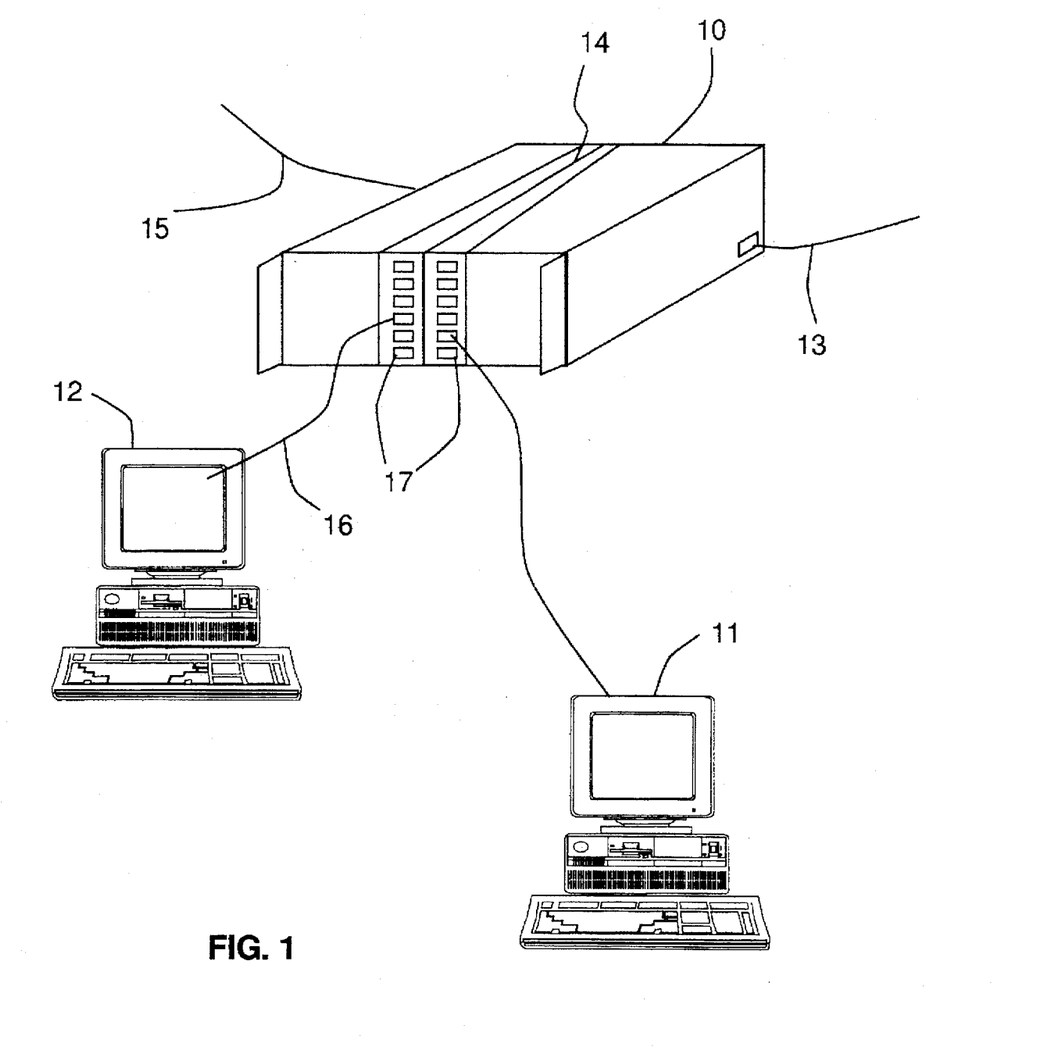
FIG. 1 showing a standard LAN implementation.

FIG. 1 shows a standard LAN implementation: a hub 10 accommodates two different types of topologies: it can first be a stand-alone LAN, providing the complete pathway for its stations 11 and 12 attached to hub ports 17 (LAN star topology). It can also acts as an internetworking unit connected to other hubs thru links 13 and 15 (hub 'backbone'), or to a Wide Area Network (WAN) thru one of the ports 17.

The protocol on links 13 and 15 is a standard one when insertion of the hub in a Token-Ring segment. The protocol relating to transport of isochronous flow as seen above is of no importance for the present invention. Also, it is to be noticed that hub 10 is represented on FIG. 1 as a fixed frame with removable cartridges or blades 14, but fixed ports could as well be implemented. The number of ports per blade is equally of no importance for the present invention.

The invention takes advantage of the star wiring topology to put resources in each station and in the hub to provide a dedicated isochronous channel in addition to the 16 Mbps data channel at hub/station interface 16.

The interface consists of a multiplexed bit stream of digital data of various channel types over which a variety of services can be offered. The channel types are:

P-Channel which is the traditional packet channel running the 802.5 MAC protocol, D-Channel, a 64 kbps full duplex packet channel for the provision of Network Access Signalling, for example via the Q.930 protocol family well-known to the man skilled in the art (ISDN compatible), B-Channel, a full duplex 64 kbps isochronous channel (ISDN compatible), and C-Channel, being any combination of between 1 to 144 of the above B-channels.

Thus, two types of frames are provided at the interface:

A synchronous Time Division Multiplexed (TDM) frame results from the time-division multiplexing of the contents of the C and D channels along with synchronization and control information. It is generated every 125 us.

The unchanged 802.5 MAC frame format is used on the P-Channel.

The interface will therefore be said to be of a 'hybrid' type.

Figure 2:
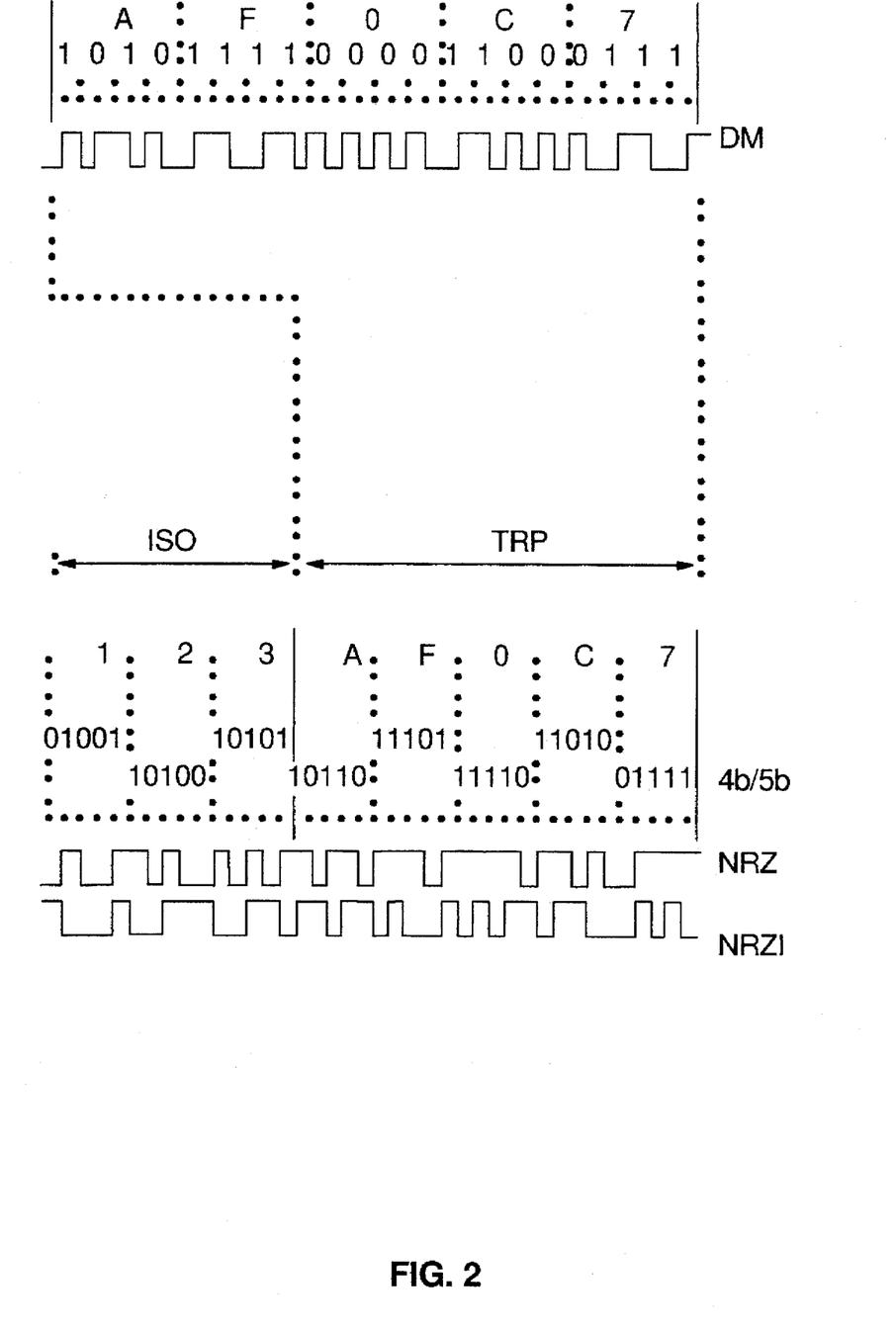
FIG. 2 being a representation of the physical bit stream according to the invention at a hub/station interface.

Now, a representation of the physical bit stream or electronic signaling protocol at the hub/station interface 16, can be found FIG. 2 (lower stream). It is there compared with the representation of the physical bit stream or electronic signaling protocol at the hub/station interface in a standard Token-Ring connection (upper stream). The minimum pulse duration in both cases is 31.25 nS (32 Mbps on the physical media). But encoding on the physical media is no more a Differential Manchester one but a 4 bit/5 bit well-known to the man skilled in the art. The maximum achievable bandwidth at the interface therefore becomes ⅘*32=25.6 Mbps, so that compared to the standard Token-Ring performance, 9.6 Mbps are made available for an isochronous traffic. Transcoding from one to the other is done according to the following table (5 data bits instead of 4):

|  |  | 4/5 | Dec |
|---|---|---|---|
| Line State SYMBOLs | Q | 00000 | 00 |
|  | I | 11111 | 31 |
| Delimiter SYMBOLs | J | 11000 | 24 |
|  | K | 10001 | 17 |
|  | T | 01101 | 13 |
|  | L | 00101 | 05 |
| Data SYMBOLs | 0 | 11110 | 30 |
|  | 1 | 01001 | 09 |
|  | 2 | 10100 | 20 |
|  | 3 | 10101 | 21 |
|  | 4 | 01010 | 10 |
|  | 5 | 01011 | 11 |
|  | 6 | 01110 | 14 |
|  | 7 | 01111 | 15 |
|  | 8 | 10010 | 18 |
|  | 9 | 10011 | 19 |
|  | A | 10110 | 22 |
|  | B | 10111 | 23 |
|  | C | 11010 | 26 |
|  | D | 11011 | 27 |
|  | E | 11100 | 28 |
|  | F | 11101 | 29 |

There is a one-to-one correspondence of data for standard Token-Ring, and data for the isochronous Token-Ring of the invention: there is no bit insertion nor bit deletion in the Differential Manchester-4 bit/5 bit transcoding. This stands for every piece of Token-Ring information, data as well as media access control such as SD (Starting Delimiter) and ED (Ending Delimiter). Delimiters are 8-bit characters on standard Token-Ring: they are kept as 8-bit characters on the isochronous Token-Ring.

On FIG. 2, SYMBOLs A,F,0,C and 7 are transcoded as an example from Differential Manchester encoding to 4 bit/5 bit. Timeframe for the same amount of information is sized down from 1.25 us to ⅝*1.25 us (TRP or 'Token-Ring Packet' field). Freed timeframe is then used for isochronous information (ISO or 'ISOchronous' field). Mixing of Token-Ring packet and isochronous data is done by intermixing a small number of isochronous SYMBOLs (3) with a small number of packet SYMBOLs (5), a symbol being defined as a half-byte, i.e. 4 data bits (8 bit time on the media for Differential Manchester encoding and 5 bit time for 4 bit/5 bit). Such an intermixing will allow to minimize buffer requirement for transcoding.

The bit time at the interface 16 is equal to the bit time of the Token-Ring segment as provided by the usual active monitor station.

The 125 us synchronization necessary to TDM frames at hybrid interface 16, comes from a local hub clock, if the hub operates in stand-alone, or is directly extracted from the remote 125 us synchronization signal of an external network (WAN), if the hub is acting as an internetworking unit. Whatever the source, it is most likely going to be asynchronous with respect to the Token-Ring bit clock, thus requiring adequate measures described with respect to FIG. 3.

Figure 3:
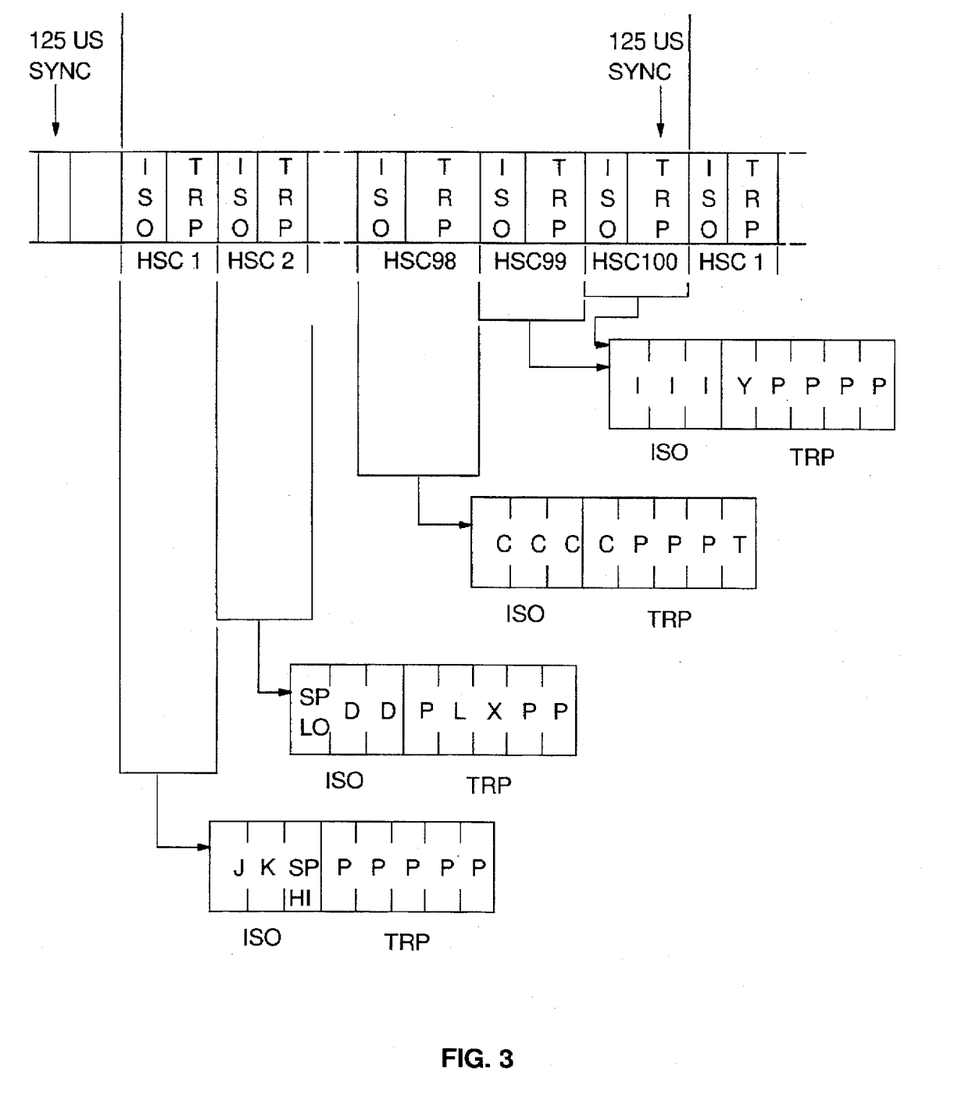
FIG. 3 showing a nominal data cycle according to the invention at the interface.

On this figure, can be seen a nominal cycle at the hybrid interface. A hybrid cycle has been chosen to be composed of a plurality of HSCs (Hybrid Sub-Cycles). A nominal cycle contains 100 HSCs.

Each HSC (Cf: also FIG. 2) contains an ISO traffic period and a TRP traffic period: a 3-SYMBOL ISO field is followed by a 5-SYMBOL TRP field. Each HSC duration is 1.25 us.

The elasticity of the hybrid cycle is at +/−1 HSC and so is the resolution:

under nominal timing, the cycle terminates at HSC100, under faster 125 us synchronization source relative to the Token-Ring clock, the cycle terminates at HSC99, under slower 125 us synchronization source relative to the Token-Ring clock, the cycle terminates at HSC101.

After occurrence of a 125 us synchronisation signal (local or remote as already seen), the cycle is terminated at the current HSC number (99, 100 or 101), and a following cycle is started with HSC1.

A unique 4 bit/5 bit sequence, the JK dual SYMBOL, is inserted in HSC1. This unique sequence is used as a delimiter for aligning hybrid data flow on 8-bit boundaries and as a marker for delimiting the beginning of a hybrid cycle. It is aligned (synchronous) with the SYMBOL (4 bit/5 bit code symbol) boundary, each SYMBOL being clocked by the Token-Ring bit clock.

Since the 125 us synchronization source can be asynchronous with respect to Token-Ring bit clock, as already explained, an information regarding the actual delay between the occurrence of the 125 us synchronization and the inserting of the dual SYMBOL JK called SP, is passed at the beginning of the hybrid cycle (HSC1 and HSC2), allowing a station to reconstruct a fine 125 us timing.

Now, the ISO field/stream features the following characteristics:

The C-Channels are placed in HSC3 to HSC98 (C SYMBOLs). They have a granularity of 64 kbps (2 contiguous C SYMBOLs) and in a format point of view (according to call set-up capability thru the D-Channel signalling) they can range in any combination from 144×64 kbps channels to one 9.216 Mbps channel. This allows to accommodate 4 E1's at 2.048 Mbps with 1.024 Mbps left spare, or 6 T1's at 1.536 Mbps.

The JK dual SYMBOL inserted in HSC1 has the particularity of being inimitable even when the SYMBOL boundary is not known. Thus, it provides the SYMBOL boundary, along with the HSC and hybrid cycle boundary.

The delay information SP is a 1 byte information whose high order symbol (SP hi) is in HSC1 and low order symbol (SP lo) is in HSC2. SP will encode the time (number of up to 255) between the actual 125 us synchronization position and the inserted JK dual SYMBOL position.

HSC99, HSC100 and HSC101 contain idle SYMBOLs 'I' in their ISO field. The number of idle SYMBOLs has been chosen so as to accommodate a multiple of 64 kbps inside the C-channels bandwidth which starts in HSC3 and ends in the HSC98.

The 2 remaining SYMBOLs D in the ISO field of HSC2 are used for transporting the signalling channel (D-Channel).

On the receive side of a station, the 'JK' delimiter detection performs the byte boundary alignment and identifies the start of the hybrid cycle.

The transmit side of a station sends hybrid information (intermixed TRP and ISO fields) to the hub via hybrid cycles marked with the same 'JK' starting delimiter.

The timing of a transmit hybrid cycle is based on the timing of the preceding receive hybrid cycle, delayed by a fixed number of segment bit times.

The receive side of the hub port receives hybrid cycles whose delay (with respect to the preceding hub transmit hybrid cycle) depends on the lobe length and on the station transit time.

Now the TRP field/stream features the following characteristics:

Any Token-Ring 8-bit character is transcoded as data character and mapped into P SYMBOLs (for P-Channel).

Regarding SD and ED, their number of bits (8) as already mentioned, is kept the same thru the Differential Manchester-4 bit/5 bit transcoding.

They indicate the Token-Ring data frame and token boundaries, and are mapped in a dual SYMBOL (LX and TY) with SD also realigned on the SYMBOL boundary and not on the HSC boundary.

As a reminder to the man skilled in the art, SD is Vv0Vv000 in Differential Manchester encoding, where V is is a 'J' physical violation on the media, and v a 'K' violation. SD is then mapped into the 4 bit/5 bit dual SYMBOL composed of the L SYMBOL followed by X='0DDD', where the 3 last bits of the SD field (set to '000' for the time being) are directly mapped into 'DDD'.

Also as a reminder, ED is Vv1Vv1IE in Differential Manchester encoding, where V is is a 'J' physical violation on the media, and v a 'K' violation. ED is then mapped into the dual SYMBOL composed of the T SYMBOL followed by Y='1DDD', where the 3 last bits of the ED field (1IE) are directly mapped into 'DDD'.

It is to be noted that the L and T SYMBOLs are inimitable only if the SYMBOL boundary is known, as made possible by other means as described above.

Figure 4:
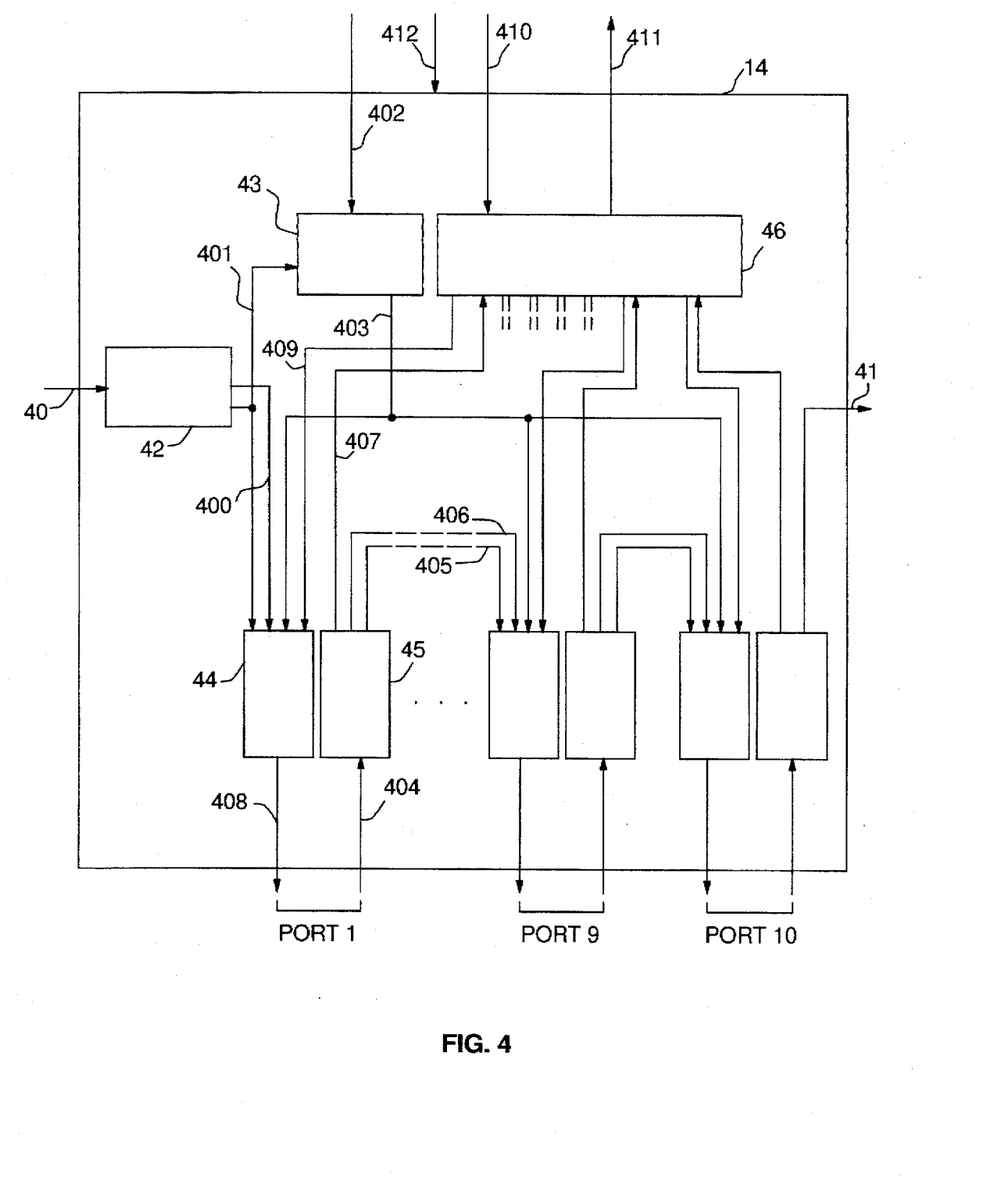
FIG. 4 being a description of concentration logic implemented in the hub.

A description of concentration logic implemented in a removable cartridge or blade 14 (or embedded in the hub) can be found with respect to FIG. 4. It shows a 10-port (as said above, the number of ports is actually of no importance) logic with ISOchronous capability.

It comprises first a CLOCK RECOVERY logic 42 from blade incoming data stream on lead 40, for regeneration of the Differential Manchester encoded data on output lead 400, and recovering of Token-Ring clock on lead 401. Such a clock recovery logic is well-known to the man skilled in the art and equipped with a Phase Locked Loop type circuit, and a retiming buffer.

A CYCLE FRAMING GENERATOR 43 receives a 125 us synchronization clock (local or remote) from the hub backplane on lead 402, and the Token-Ring clock on lead 401, and generates control signals on bus 403 to each of the 10 ports. It is to be noticed that the cycle framing generator function can be centralized only if all 10 ports are connected to the same Token-Ring segment. In the case when concentration logic must support per port switching on different Token-Ring segments, this function has to be replicated on each port. A more detailed description of CYCLE FRAMING GENERATOR 43 is provided with FIG. 5.

Each port is made up of a PORT TRANSMIT INTERFACE 44, and a PORT RECEIVE INTERFACE 45.

Data from a station hooked to the hub is input on lead 404 to PORT RECEIVE INTERFACE 45. TRP Differential Manchester encoded data are output on lead 406 on to the next active port, and specifically to its port transmit interface (Logic for ports 2 to 8 not being represented on FIG. 4), along with a recovered strobe clock on lead 405, while ISO data are output on lead 407. More details regarding PORT RECEIVE INTERFACE 45 are provided with respect to FIG. 6.

Data to the station hooked to the hub is output on lead 408 from PORT TRANSMIT INTERFACE 44. Differential Manchester encoded data are received on lead 400 along with Token-Ring clock on lead 401. Control signals are input on bus 403. ISO data are received on lead 409. More details regarding PORT TRANSMIT INTERFACE 44 are provided with respect to FIG. 7.

Differential Manchester encoded data are output from the blade on lead 41.

Finally, concentration logic also comprises a SWITCH 46. The switch receives a hub local clock on lead 412, which otherwise distributes on the whole concentration logic in blade 14. ISO traffic interchange with the hub backplane is ensured thru leads 410 and 411. ISO traffic interchange inbetween ports or between ports and the hub is ensured thru leads 407 and 409 replicated for each port. Switching logic within SWITCH 46 is within the scope of knowledge of the man ordinary skilled in the art of switching real time data flows (such as telephone switching).

Figure 5:
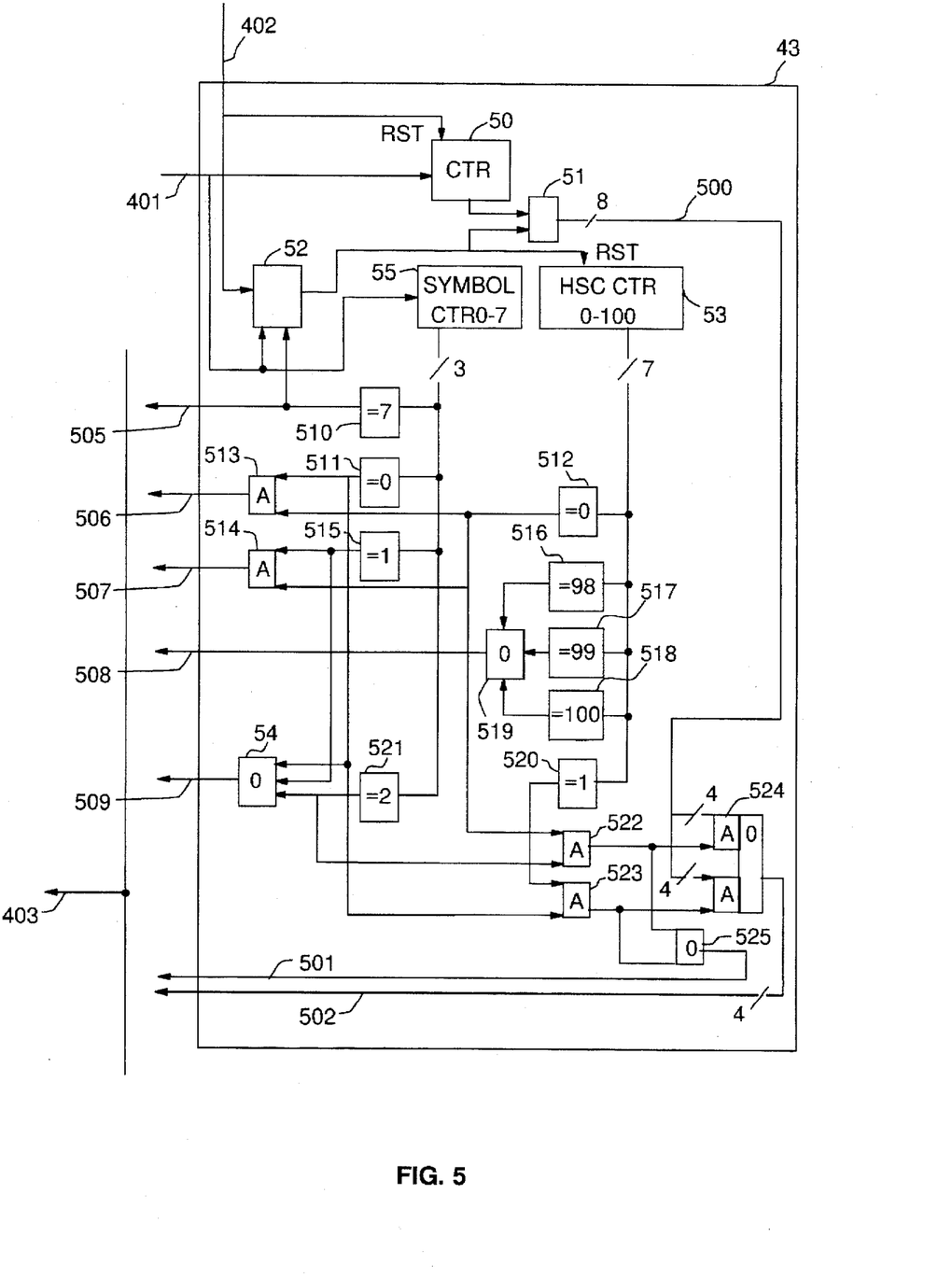
FIG. 5 being a detailed description of a cycle framing generator in the concentration logic according to the invention.

A detailed description of CYCLE FRAMING GENERATOR 43 can be found with respect to FIG. 5. This logic allows to generate the time references so as to adequately mix the two ISO and TRP streams in the PORT TRANSMIT INTERFACE 44.

The Token-Ring clock on lead 401 clocks a SYMBOL CTR 55. This counter counts from 0 up to 7 (8 SYMBOLs per HSC as seen with respect to FIG. 3) on its 3-bit output, on which are hooked decoders 510 (having its output 505 activated during the 8th SYMBOL time for any HSC), 511 (1st SYMBOL), 515 (2nd SYMBOL) and 521 (3rd SYMBOL).

Lead 505 is connected to a resynchronization logic 52, which, also fed with the Token-Ring and 125 us synchronization clocks on leads 401 and 402, delivers on its output a 125 us clock resynchronized on the HSC boundaries. This latter signal resets HSC CTR 53.

HSC CTR 53 can count from 0 up to 100 (up to 101 HSCs per hybrid cycle, see also explanations regarding FIG. 3) on its 7-bit output, on which are hooked decoders 512 (having its output activated during HSC1 time for any hybrid cycle at the interface), 516 (HSC99), 517 (HSC100), 518 (HSC101), and 520 (HSC2). It is being reset, according to the above paragraph, after having counted 98, 99 or 100.

A delay is measured in Token-Ring bit times between the resynchronized 125 us clock, and the 125 us synchronization clock from the hub backplane 402, by logic in blocks CTR 50 and 51. CTR 50 is indeed reset by the latter clock, and clocked by Token-Ring clock 401. The value reached by CTR 50 for any delay is loaded into register 51 at each resynchronized 125 us period, as the output of block 52 is input on register 51 and allows the latching mechanism. A valid delay value is then present on 8-bit bus 500, of which 4 low-order bits are input on a first input of a selector 524, and 4 high-order bits are input on a second input of the same selector. The first input of selector 524 is gated by the output of a AND gate 522, while the second input of selector 524 is gated by the output of a AND gate 523. AND 522 is activated during the 3rd SYMBOL in the 1st HSC of a hybrid cycle (outputs of decoders 521 and 512), and AND 523 during the 1st SYMBOL in the 2nd HSC (outputs of decoders 511 and 520).

Outputs of the two AND gates are otherwise ORed by gate 525 (output on lead 501 being then activated at the 3rd SYMBOL in the 1st HSC and the 1st SYMBOL in the 2nd HSC).

The valid delay value is therefore present on bus 502 for the 4 low-order bits during the 1st SYMBOL of the 2nd HSC time, and 4 high-order bits in the 3rd SYMBOL of the 1st HSC.

Besides, outputs of decoders 511 and 512 are ANDed at gate 513, the output 506 of which being then activated during the 1st SYMBOL in the 1st HSC, outputs of decoders 515 and 512 are ANDed at gate 514, the output 507 of which being then activated during the 2nd SYMBOL in the 1st HSC, outputs of decoders 516, 517 and 518 are ORed at gate 519, the output 508 of which being then activated during the last HSCs 99, 100 and 101 (when present) of a cycle, and outputs of decoders 511, 515 and 521 are ORed at gate 54, the output 509 of which being then activated during the first three SYMBOLs of any HSC.

It can be understood that this way, CYCLE FRAMING GENERATOR 43 provides control information on bus 403, with (see also FIG. 3):

information on lead 505 allowing delimiting HSC boundaries, information on lead 506 allowing positioning J SYMBOL in a hybrid cycle, information on lead 507 allowing positioning K SYMBOL in a hybrid cycle, information on lead 508 allowing positioning I SYMBOLs in a hybrid cycle, information on lead 509 allowing delimiting ISO/TRP fields within HSCs, information on lead 501 allowing positioning SP Symbol in a hybrid cycle, information on lead 502 being the SP Symbol value to be positioned in a hybrid cycle.

Figure 6:
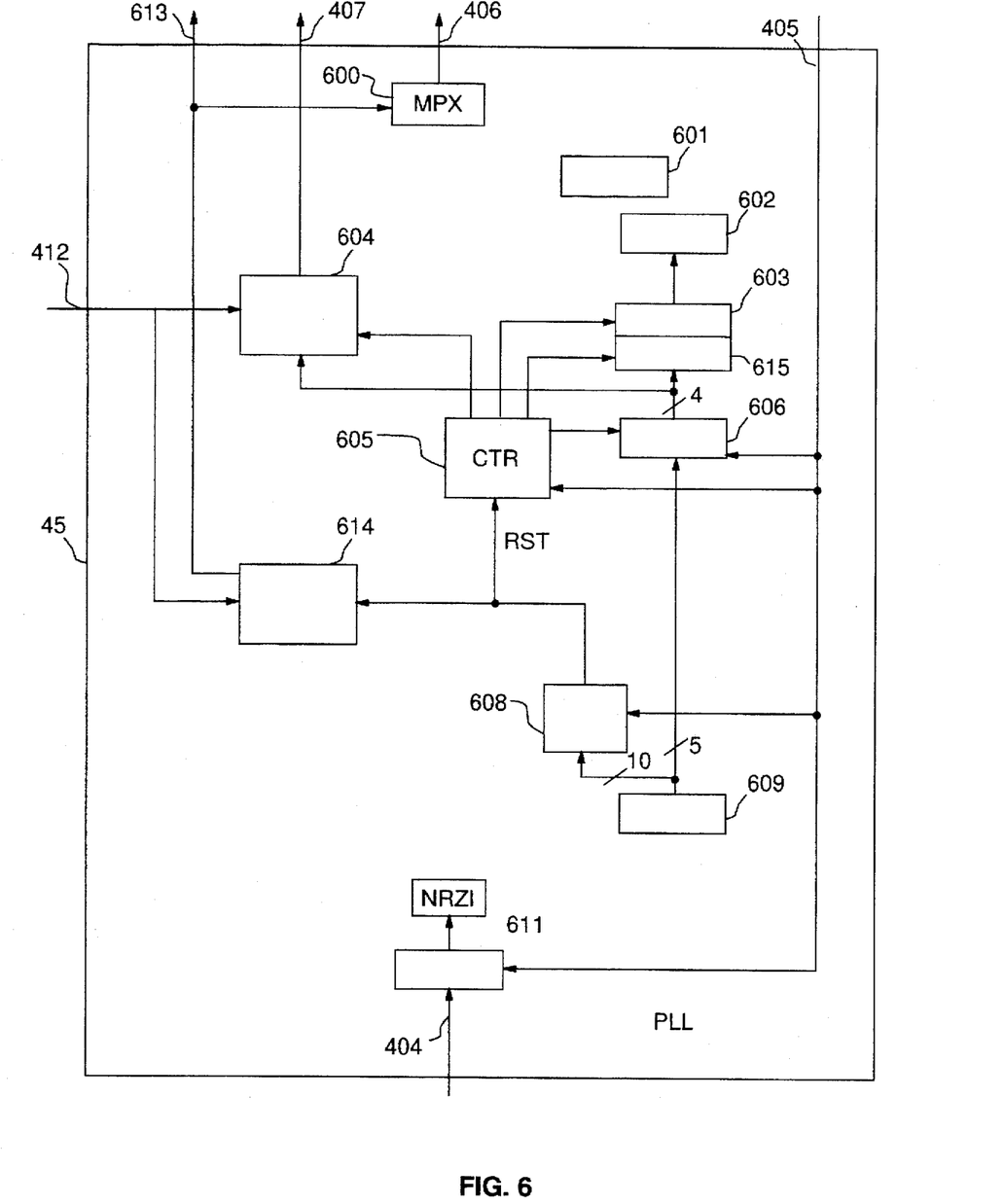
FIG. 6 being a detailed description of a port receive interface.

A detailed description of PORT RECEIVE INTERFACE 45 can be found with respect to FIG. 6.

This whole logic is meant for:

outputting on lead 406 (forwarded to the PORT TRANSMIT INTERFACE of the next active port in the Token-Ring according to FIG. 4), a packet data flow which is either extracted from the TRP fields of a hybrid flow incoming from a station having the isochronous capability, or is the straightforward incoming data from a standard station, and outputting on lead 407 (forwarded to SWITCH 46 according to FIG. 4), an isochronous data flow extracted from the ISO fields of a hybrid flow incoming from a station having the isochronous capability.

The selection of one of the two packet data flows is performed by a multiplexor 600 set by a signal on lead 613 output by an automatic mode detection logic in block 614, as described below in more details.

Data from a station is input from lead 404 on retiming register 611 and a PLL mechanism 612: output of this latter logic is a stabilized recovered strobe clock on lead 405, which feeds the whole PORT RECEIVE INTERFACE 45 (and also the PORT TRANSMIT TRANSMIT INTERFACE of the next port in the Token-Ring according to FIG. 4), and more particularly retiming register 611.

A jitter-free data is therefore present at the output of block 611 which, according to the above, is input directly into multiplexor 600 (to handle the case of a standard station hooked to the hub port), and also into a NRZI decoder (well-known to the man skilled in the art) 610 so as to alternatively be able to handle the case of a station having isochronous capabilities (4 b/5 b encoding being NRZI).

The output of NRZI decoder 610 is obviously a NRZ data which is input into a deserializer 609. The deserialized data feeds a JK decoder 608 (10 parallel bits) and a 4 b/5 b decoder 606 (5 parallel bits).

JK decoder 608 is able, with means well-known to the man skilled in the art, to detect the presence of a dual JK SYMBOL in the deserialized data. Checking is performed at each bit time due to the signal on lead 405 which clocks block 608. JK dual SYMBOL is a unique data pattern in both Differential Manchester and 4 b/5 b encoding; its detection activates the output of decoder 608, which triggers automatic mode detection logic 614 and resets a counter 605, indicating the beginning of an incoming hybrid cycle, and rending the latter counter capable of delivering SYMBOL, HSC as well as ISO/TRP boundary information.

4 b/5 b decoder 606 transforms 5-bit SYMBOLs into 4-bit ones on its 4-bit output. Loading of 5-bit SYMBOLs is done every 5-bit time (according to the output of counter 605 to 4 b/5 b decoder 606) starting from the JK detection event. The 4-bit SYMBOLs are then forwarded to an ISO data resynchronization logic in block 604, and a TRP data retiming logic in block 615/603.

In block 604, the first three SYMBOLs of each HSC starting from the JK detection event are loaded according to the output of counter 605 to block 604, and evenly expanded at a constant rate on lead 407 according to the hub local clock 412 (ISO extracted flow: rate of between 297 and 303 SYMBOLs, as there are 99 to 101 HSCs per cycle, or 1188 to 1212 bits per 125 us synchronization period, that is around 9.6 Mbps, relative to the Token-Ring clocking reference).

In block 615, the last five SYMBOLs of each HSC starting from the same JK detection event are loaded according to the output of counter 605 to block 615, forwarded on to block 603, and evenly expanded at a constant rate from there according to the output of counter 605 to block 603 (TRP extracted flow: rate of between 495 and 505 SYMBOLs or 1980 to 2020 bits per 125 us synchronization period, but exactly 16 Mbps relative to the Token-Ring clocking reference).

4-bit NRZ data present on the output of block 603 are then serialized in block 602, then Differential Manchester encoded in block 601. The output of this latter block feeds one of the two inputs of multiplexor 600, as explained before, a single input from the two being selected according to the automatic mode detection logic as explained hereafter.

As a reminder, the Token-Ring station insertion process comprises 5 phases:

Phase 0: Lobe testing
Phase 1: Monitor check
Phase 2: Duplicate address check
Phase 3: Participation in Neighbor_Notification
Phase 4: Request initialization The automatic mode detection of the present invention takes place during Phase 0, the other phases remaining unchanged.

During Phase 0, data are received from the station in PORT RECEIVE INTERFACE 45, wrapped onto PORT TRANSMIT INTERFACE 44 then forwarded back to the station (local loop).

At the very beginning of Phase 0, hub port interfaces are configured as being able to handle standard Token-Ring stations.

If the station is indeed a standard one, the standard insertion process is resumed. Otherwise, the station is expected to send a plurality of successive JK dual SYMBOLs so as to identify itself as an isochronous one. Automatic mode detection logic in block 614 is clocked by the hub local clock on lead 412; the clock is divided within the block, so as to provide a 250 us period clock. Output of JK decoder 608 is checked within the latter time window: if the plurality of JK dual SYMBOLs is detected, implying means that are well-known to the man skilled in the art, this means that the station attached to the hub port is a one with isochronous capability. Output signal on lead 613 is set accordingly.

In that case, the hub switches its port interfaces to the isochronous configuration, and starts sending one JK dual SYMBOL to the station every 125 us.

The rest of the station insertion process is identical to that of a standard Token-Ring. In particular, upon successful local loop test, the station sends a 5-volt DC voltage (phantom current) to open a hub internal relay and attach to the ring.

It is to be noticed that the order in which JK SYMBOLs are sent could be reversed, and the hub could initiate sending the SYMBOLs in 4 b/5 b encoding, then decide, upon the station's reaction, to switch or not its interfaces to standard Token-Ring capability.

Back to FIG. 4, standard relays are implemented in the hub so as to allow the PORT RECEIVE INTERFACE 45 onto PORT TRANSMIT INTERFACE 44 loop, and also the bypassing of both interfaces when no station is hooked to a given port so as to ensure a ring continuity.

On an isochronous station side, the automatic mode detection is slightly different than that of the hub. If in local loop test, the station receives back the plurality of sent JK dual SYMBOLs, this means that the hub is a standard Token-Ring one, in which case the station switches its interfaces to the standard configuration.

Figure 7:
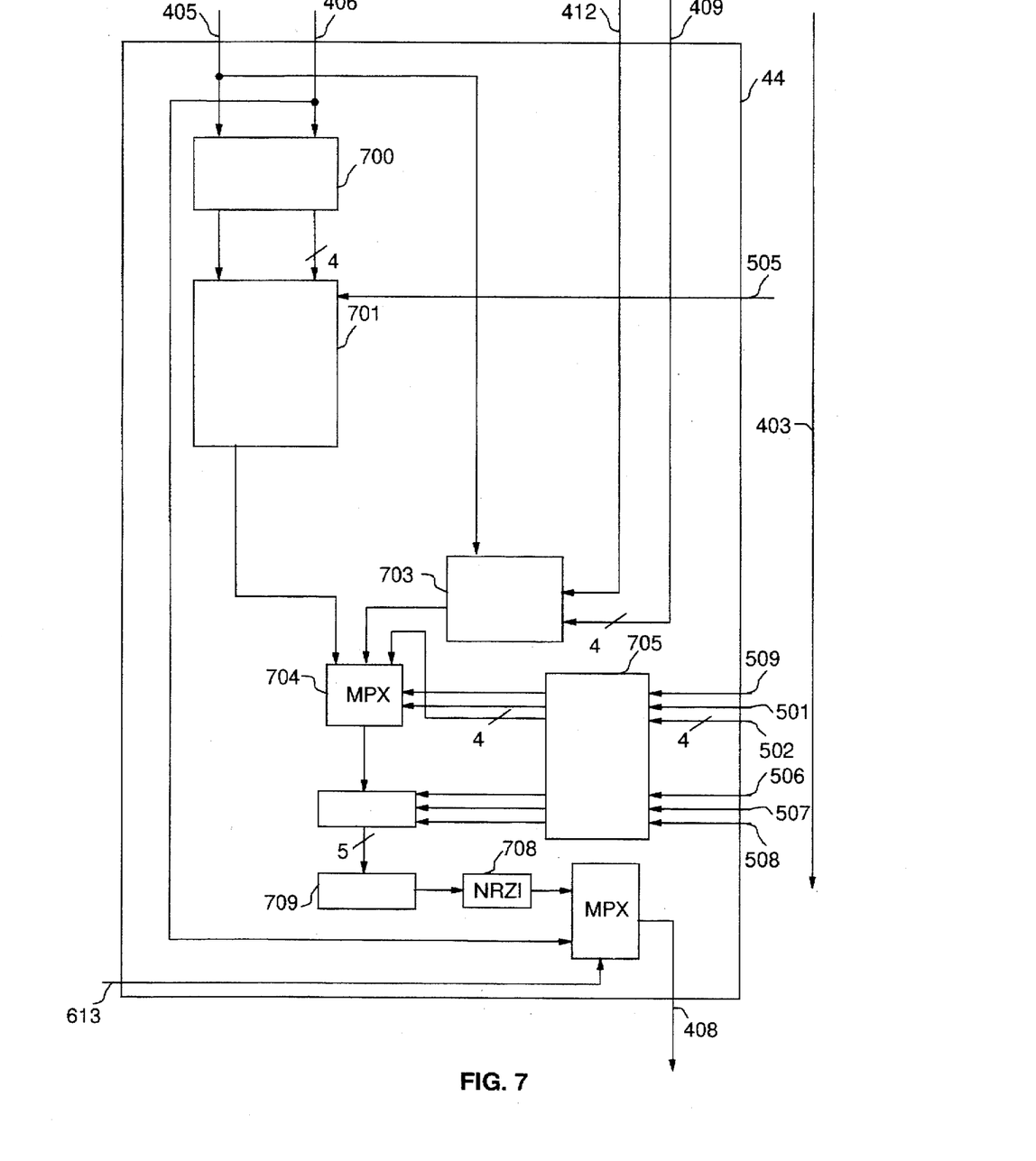
FIG. 7 being a detailed description of a port transmit interface.

A detailed description of PORT TRANSMIT INTERFACE 44 can be found with respect to FIG. 7.

The interface is clocked by the strobe clock 405 recovered in the preceding active port in the ring, and more particularly by its PORT RECEIVE INTERFACE, the hub local clock on lead 412, and is controlled by signals incoming from CYCLE FRAMING GENERATOR 43 on bus 403, and the ISO/TRP information on lead 613 from the PORT RECEIVE INTERFACE in the same port. Incoming data to forward on lead 408 to the station attached to the port, are present on lead 406 for packet data from the preceding active port in the ring, and more particularly from its PORT RECEIVE INTERFACE, and lead 409 for isochronous data from SWITCH 46.

Incoming packet Differential Manchester encoded data are deserialized in block 700. SD is detected so as to output on a 4-bit bus data synchronized on a byte boundary, along with a control lead to indicate for each incoming SD or ED the presence of a 'special' non-binary value on the bus, and a clock having a 4 bit time period.

Therefore on the bus between block 700 and buffer 701, is incoming an even flow of packet data. Buffer 701 is of the FIFO type, from which data are output at a rate of 5 concatenate 4-bit SYMBOLs for the TRP field of a hybrid cycle, this operation being made possible by the information regarding HSC boundaries on lead 505.

Now, with respect to FIFO buffer 703, isochronous data incoming on lead 409 are latched by the hub local clock on lead 412, and output at a rate of 3 concatenate 4-bit SYMBOLs for the ISO field of a hybrid cycle, resynchronized on the recovered strobe clock of lead 405.

A sampling logic 705 accommodates the phase difference between signals incoming from CYCLE FRAMING GENERATOR 43, and the Token-Ring clock at the port level (the phase difference comes from the fact that the Token-Ring clock used by CYCLE FRAMING GENERATOR 43 from lead 401, is recovered from the 'Ring In' input 40 of concentration logic 14, while the Token-Ring clock used by PORT TRANSMIT INTERFACE 44 is recovered from the preceding active PORT RECEIVE INTERFACE 45, leading to an arbitrary phase difference that has to be corrected).

Multiplexor 704 is able according to signals incoming from CYCLE FRAMING GENERATOR 43, to reconstruct a hybrid cycle, filling the output flow with either packet data (TRP field), isochronous data (ISO field) or SP value in ISO field (according to information on lead 502).

Multiplexed 4-bit SYMBOLs are then 4 b/5 b encoded in block 706. Encoding of SD and ED is performed (Cf description with respect to FIG. 3). The 5-bit output is the input of block 707 which is a common serializer. Serial flow is then NRZI encoded thru logic in block 708.

The selection between one of the two flows (reconstructed hybrid flow or unchanged Token-Ring packet data flow) is done at multiplexor 709 set by the signal on lead 613 (automatic mode detection).

On an isochronous station side, transmit and receive interfaces are identical to those that have been described with respect to a hub, except that no CYCLE FRAMING GENERATOR is needed due to the fact that the hub is mastering the filling of ISO fields in the hybrid cycle.

It will be obvious to the man skilled in the art that:

- The 125 us synchronization clock on lead 402 is generated within the hub either by dividing a hub local clock such as the one present on lead 412, or by extracting synchronization signals provided remotely by a WAN attached to the hub.

- The hub local clock such as the one present on lead 412 can preferably have a 40 ns period. Faster clocks can be chosen so as to better handle the isochronous flows as seen above. Slower clocks could be chosen for money sake.

- Inputs and outputs 410/411 to and from SWITCH 46 for several concentration cards are handled in the hub by another mechanism capable of switching the isochronous flows between any hub port to any other port, or between a hub port and another port in a remote hub thru a backbone connection featuring for example a 100 Mbps rate.

- Physical attachment to a Token-Ring can already be performed by chipsets available on the market (see for example chip TMS38054 and series).

- Appart from the 'sending a plurality of successive JK dual SYMBOLs' feature required at the very beginning of a station insertion process, all features for both the isochronous hub and station are directly allowed using a standard and already available software such as the 802.5 MAC protocol on the P-Channel (packet flow), and for example the Q.930 protocol family on the D-Channel (control channel for the isochronous flow).

- The isochronous hub of the invention is capable of handling cartridges or blades with a concentration logic featuring or not the isochronous capability.

Although the invention has been described in a particular embodiment, the description is sufficient to allow easy embodiment of the invention in several other fashions.

We claim:

1. In a data transmission system having first and second transmission networks employing first and second signalling protocols each having a maximum signalling frequency, respectively, and at least one node connected to both said transmission networks and to a remote station via a transmission link having frequency and distance characteristics designed for transporting data signals from only one of the networks to the stations, a method including the following steps:

receiving signals from said first and second transmission networks;

converting the received signals to a third signalling protocol in which the maximum frequency of the signal does not exceed the maximum frequency of the higher of the said first and second signalling protocols;

generating, using the said third signalling protocol, a periodic time division multiplex frame which includes in each period data received from both of the said first and second transmission networks; and transmitting the periodic time division multiplex frame to the remote station via the said transmission link connecting the node to the remote station.

2. A method as set forth in claim 1 in which the signaling protocol used on the said first network is the differential manchester code, the signalling protocol used on the second network is an isochronous protocol and the signalling protocol used to transmit the periodic multiplex frame to the node is the 4 b/5 b code.

3. In a data transmission system having first and second transmission networks employing first and second signalling protocols each having a maximum signalling frequency, respectively, and at least one node connected to both the said transmission networks and to a remote station via a transmission link having frequency and distance characteristics designed for transporting data signals from only one of the networks to the station, a method including the following steps:

at said station generating a periodic multiplex frame including in each period data for transmission over the said first and second networks, respectively, using a third signalling protocol having a maximum frequency no greater than the maximum frequency of the greater of the first and second signalling protocols;

transmitting said multiplex frame via said transmission link to the said node;

at said node demultiplexing the received frame into a first data stream including the data to be transmitted over the first network and a second data stream including the data to be transmitted over the second network; and, transmitting the said first and second data streams over the said first and second networks using the said first and second signalling protocols, respectively.

4. A method as set forth in claim 3 in which the signalling protocol used on the said first network is the differential manchester code, the signalling protocol used on the second network is an isochronous protocol and the signalling protocol used to transmit the periodic multiplex frame to the node is the 4 b/5 b code.

5. A communication hub for simultaneously connecting a plurality of stations to first and second communication networks each employing a different signalling protocol including:

a plurality of ports each adapted for connection to one station;

means for receiving signals from the said first and second networks and for deriving clocking signals from the received signals;

means responsive to the said derived clock signals for adjusting the phase of one signal to correspond to the other and for providing timing control signals;

means responsive to the signals from the first and second networks, the timing control signals, the adjusted phase clock signal and the other clock signal for generating a periodic multiplex frame having a frame frequency corresponding to the frequency of the phase adjusted clock signal and including a plurality of sub-frames each including a fixed number of signalling elements from each network; and, means responsive to the periodic frame for encoding the multiplex frame using a third signalling protocol different than the signalling protocols used in the said first and second communication networks, said third signalling protocol having a minimum pulse duration substantially equal to the shorter of the pulse durations generated by the signalling protocols used in either of the said first or second communication networks, and for connecting the frame to one port.

6. A communication hub for simultaneously connecting a plurality of stations to first and second communication networks each employing a different signalling protocol, at least one of which is an isochronous protocol, including:

at least one port for receiving from a connected station a frame having a frame period corresponding to the said at least one isochronous protocol and a plurality of sub-frames included therein, each of which includes a fixed number of signal elements for each of said first and second communication networks and is encoded using a third signalling protocol different from the signalling protocols used on the said first and second communication networks and having a minimum pulse duration substantially equal to the shorter of the pulse durations produced by either one of the signalling protocols used on the said first or second networks;

means responsive to the received periodic frame for demultiplexing the signals into a first and a second signal stream for transmission over the said first and second networks, respectively;

means for converting the two streams into a protocol suitable for transmission over the said first and second networks; and, means for connecting the protocol converted signal streams to their respective network media.

7. In a data transmission network a method of combining isochronous data signals transmitted in a first signalling protocol on a first network and synchronous data signals transmitted in a second signalling protocol on a second network into multiplexed data signals in a third signalling protocol suitable for transmission over a link to a station including the following steps:

deriving clocking signals from the signals on the first and second networks;

resynchronizing the isochronous clock signals with the synchronous clock signals;

converting the signals on the first and second networks to a third signalling protocol having a minimum pulse duration substantially equal to the shorter of the pulse durations produced by either the said first or second signalling protocols; and, generating a periodic frame having a frame frequency corresponding to a frequency component of the isochronous data signals and including a plurality of subframes each of which includes a fixed number of signal elements from each of said first and second networks in the said third signaling protocol.

8. A method as set forth in claim 7 in which the synchronous data signals are in the differential manchester signaling protocol and the third protocol is the 4 bit/5 bit signalling protocol.

* * * * *